United States Patent
Foland, Jr.

(10) Patent No.: US 8,345,523 B1
(45) Date of Patent: *Jan. 1, 2013

(54) METHOD AND APPARATUS FOR OPTIMIZING OPTICAL RECORDING

(75) Inventor: William R. Foland, Jr., Golden, CO (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 13/440,471

(22) Filed: Apr. 5, 2012

Related U.S. Application Data

(63) Continuation of application No. 12/360,660, filed on Jan. 27, 2009, now Pat. No. 8,154,968.

(51) Int. Cl.
*G11B 7/00* (2006.01)

(52) U.S. Cl. .................. 369/59.11; 369/47.53; 369/47.5; 369/53.13

(58) Field of Classification Search .............. 369/59.11
See application file for complete search history.

(56) References Cited

U.S. PATENT DOCUMENTS

| | | | |
|---|---|---|---|
| 5,642,343 | A | 6/1997 | Toda et al. |
| 6,243,339 | B1 | 6/2001 | Spruit et al. |
| 7,933,183 | B2 | 4/2011 | Shin |
| 8,154,968 | B1 * | 4/2012 | Foland, Jr. ............ 369/59.11 |
| 2005/0030860 | A1 | 2/2005 | Gage et al. |
| 2005/0157620 | A1 | 7/2005 | Narumi et al. |
| 2006/0203674 | A1 | 9/2006 | Schreurs et al. |
| 2007/0047408 | A1 | 3/2007 | Yu et al. |
| 2009/0245051 | A1 | 10/2009 | Yu et al. |

* cited by examiner

*Primary Examiner* — Van Chow

(57) ABSTRACT

Aspects of the disclosure can provide a method to optimize optical recording. The method can include recording a predefined pattern on an optical medium according to a first write strategy, measuring edge timings corresponding to the predefined pattern recorded on the optical medium, determining a second write strategy including at least timing modifications to the first write strategy. The timing modifications can be determined based on means and variances of the measured edge timings, edge timing means and variances targets for desired edge timings, and edge timing sensitivities to the timing modifications.

20 Claims, 6 Drawing Sheets

401 — PRECEDING SPACE
402 — MARK
403 —

| PRECEDING SPACE | MARK | | | |
|---|---|---|---|---|
| | 3 | 4 | 5 | 6 |
| 3 | 120 | 60 | 60 | 210 |
| 4 | 60 | 30 | 30 | 180 |
| 5 | 60 | 30 | 30 | 180 |
| 6 | 60 | 30 | 30 | 210 |
| 7 | 60 | 30 | 30 | 150 |
| 8 | 60 | 30 | | 120 |
| 9 | 60 | | | 120 |

FIG. 4A

405 — FOLLOWING SPACE
406 — MARK
407 —

| FOLLOWING SPACE | MARK | | | |
|---|---|---|---|---|
| | 3 | 4 | 5 | 6 |
| 3 | 60 | 30 | 30 | 330 |
| 4 | 60 | 30 | 30 | 180 |
| 5 | 60 | 30 | 30 | 180 |
| 6 | 60 | 30 | 30 | 210 |
| 7 | 60 | 30 | 60 | 120 |
| 8 | 60 | 60 | | 90 |
| 9 | 120 | | | 60 |

FIG. 4B

SENSITIVITY MATRIX $S_{SXMY}$ — 510

| | M3 | M4 | M5 | M6 |
|---|---|---|---|---|
| S3 | 3 | 4 | 5 | 1 |
| S4 | ·· | ·· | ·· | ·· |
| S5 | ·· | ·· | ·· | ·· |
| S6 | ·· | ·· | ·· | ·· |
| S7 | ·· | ·· | ·· | ·· |
| S8 | ·· | ·· | X | ·· |
| S9 | ·· | X | X | ·· |

FIG. 5A

SENSITIVITY MATRIX $S_{MXSY}$ — 520

| | S3 | S4 | S5 | S6 | S7 | S8 | S9 |
|---|---|---|---|---|---|---|---|
| M3 | ·· | ·· | ·· | ·· | ·· | ·· | ·· |
| M4 | ·· | ·· | ·· | ·· | ·· | ·· | X |
| M5 | ·· | ·· | ·· | ·· | ·· | X | X |
| M6 | ·· | ·· | ·· | ·· | ·· | ·· | ·· |

FIG. 5B $$A_{MXSY} = (P_{MXSY} - T_{MXSY})/S_{MXSY} \times F$$
$$A_{SXMY} = (P_{SXMY} - T_{SXMY})/S_{SXMY} \times F$$

FIG. 5C

METHOD AND APPARATUS FOR OPTIMIZING OPTICAL RECORDING

CROSS-REFERENCE TO PRIOR APPLICATIONS

This application is a continuation of U.S. patent application Ser. No. 12/360,660, filed on Jan. 27, 2009, the disclosure of which is incorporated by reference in its entirety.

INCORPORATION BY REFERENCE

This application further incorporates U.S. patent application Ser. No. 12/360,587, entitled "Method and Apparatus for Optimizing Optical Recording," and filed on Jan. 27, 2009, by reference in its entirety.

BACKGROUND

An optical recording system can use laser pulses to record data, for example in the form of marks and spaces, on an optical storage medium. The recording quality, which may determine reading compatibility by other optical reading/recording systems, can be affected by properties of both the optical recording system and the optical storage medium. In order to improve the recording quality, an optical recording system may perform a calibration procedure, such as an optimum power calibration (OPC) procedure, to obtain appropriate parameter values of laser pulses corresponding to a specific optical storage medium, before an actual recording of user data. Then, the optical recording system can use the laser pulses with the appropriate parameter values to perform the user data recording on the specific optical storage medium.

SUMMARY

Aspects of the disclosure can provide a method to optimize optical recording. The method can include recording a pre-defined pattern on an optical medium according to a first write strategy, measuring edge timings corresponding to the pre-defined pattern recorded on the optical medium, and determining a second write strategy including at least timing modifications to the first write strategy. The timing modifications can be determined based on means and variances of the measured edge timings, edge timing means and variances targets for desired edge timings, and edge timing sensitivities to the timing modifications. The method can further include recording a pre-defined pattern on the optical medium according to the second write strategy to determine if the second write strategy satisfy the edge timing targets.

In addition, the method can include obtaining the edge timing means and variances targets, and the edge timing sensitivities from a storage medium. The edge timing means and variances targets, and the edge timing sensitivities can be pre-calculated, and stored in the storage medium.

According to an aspect of the disclosure, the pre-defined pattern can include an optical power and timing calibration pattern. The pre-defined pattern can be recorded in an optical power calibration section of the optical medium.

According to an aspect of the disclosure, an edge timing sensitivity is a function of context spaces and context marks.

Further, the write strategy can include at least one of a block strategy, a castle strategy, and a pulse strategy.

In addition to the timing modifications, the second write strategy can include power modifications to the first write strategy.

Aspects of the disclosure can provide an optical drive. The optical drive can include a recording unit configured to drive a laser unit to record patterns on an optical medium according to a write strategy, a reading unit configured to generate reading signals corresponding to recorded patterns on the optical medium, and a controller. The controller can be configured to provide the recording unit with a first write strategy for the recording unit to record a pre-defined pattern on the optical medium. Further, the controller can measure edge timings corresponding to the recorded pre-defined pattern from signals generated by the reading unit. Then, the controller can determine a second write strategy including at least timing modifications to the first write strategy, and provide the second write strategy to the recording unit. According to the disclosure, the timing modifications can be determined based on means and variances of the edge timings, edge timing means and variances targets and edge timing sensitivities to the timing modifications. Further, the optical drive may record a pre-defined pattern according to the second write strategy to determine if the second write strategy satisfies the edge timing targets.

BRIEF DESCRIPTION OF THE DRAWINGS

Various exemplary embodiments of this disclosure will be described in detail with reference to the following figures, wherein like numerals reference like elements, and wherein:

FIGS. 4A-4D show exemplary tables and plots for obtaining an edge timing distribution; and FIGS. 5A-5C show exemplary matrices and equations for a calibration process.

DETAILED DESCRIPTION OF EMBODIMENTS

Figure 1:
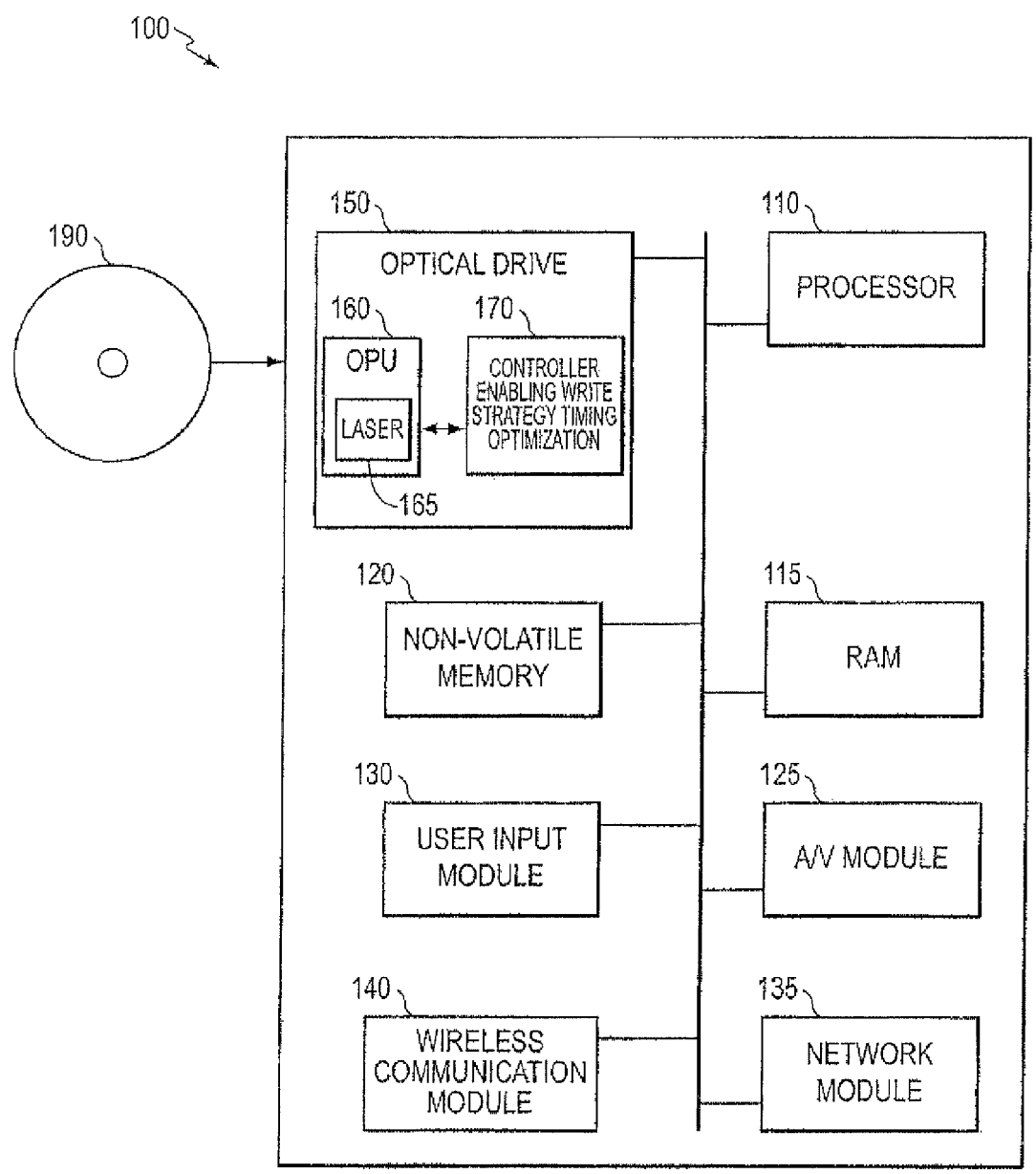
FIG. 1 shows a block diagram of an exemplary medium system.

FIG. 1 shows a block diagram of an exemplary medium system according to the disclosure. The medium system 100 can include an optical drive 150 and other components, such as a processor 110, a random access memory (RAM) module 115, a non-volatile memory module 120, an audio/video module 125, a user input module 130, a network module 135, and a wireless communication module 140. These components can be coupled together as shown in FIG. 1.

The optical drive 150 can further include an optical pickup unit (OPU) 160, and a controller 170. The OPU 160 can record data to a memory medium, such as an optical disc 190, and can read the recorded data from the optical disc 190. The optical disc 190 may store data on a recording track in the form of marks and spaces.

The OPU 160 can further include a laser unit 165. The laser unit 165 can be controlled to record data on the optical disc 190 in a recording process and can be used to read the recorded data from the optical disc 190 in a reading process. During the recording process, the laser unit 165 can be controlled to emit high power laser pulses according to a write strategy and data to be recorded. The write strategy may include write strategy parameters for the laser pulses, such as pulse length, pulse phase, pulse interval, switch speed, and the like. The data to be recorded may be encoded according to one or more coding schemes. According to the write strategy and the data to be recorded, the laser pulses can be directed to the recording track of the optical disc 190, and may selectively change an optical property, such as reflectivity, of the recording track, such that the recording track can be in the form of marks and spaces.

During the reading process, the laser unit 165 can be controlled to emit a low energy laser beam. The laser beam can be directed onto the recording track of the optical disc 190. The laser beam can be reflected by the recording track. The reflected laser beam may have a light intensity corresponding to the optical property of the recoding track. Further, the light intensity can be detected by a detector (not shown) of the OPU 160. The detector may generate an electrical signal, such as a voltage signal, corresponding to the light intensity. The electrical signal may have a property, such as an amplitude of the voltage signal, corresponding to the optical property at the recording track, which can be used to differentiate the marks or the spaces on the recording track.

It is noted that various coding schemes may use transitions between marks and spaces to encode data instead of directly using marks and spaces to represent binary states in order to improve recording performance. For example, a non-return-to-zero inverted (NRZI) coding scheme may use transitions, including transitions from marks to spaces, or transitions from spaces to marks, to encode "1", and use no-transitions to encode "0". The transition based coding schemes can reduce DC noise influence, and thus improve recording performance.

The transitions between marks and spaces may result in edges, such as voltage increase edges and voltage decrease edges, in the electrical signal generated by the detector of the OPU 160. The edges can be compared to a system clock to obtain edge timings. The edge timings can be used to decode the encoded data. In the NRZI example, timings of two adjacent edges may determine a number of zeros between two ones. Thus, timings for the laser pulses to record the transitions between marks and spaces can have an effect on the recording performance.

According to the disclosure, the controller 170 can enable a write strategy timing optimization process to determine an optimum write strategy for the optical drive 150 to record data on the specific optical disc 190. The controller 170 can control the laser unit 165 to record a pre-defined pattern on the optical disc 190 according to an initial write strategy. In an embodiment, the initial write strategy may be determined from address in pre-groove (ADIP) information on the optical disc 190. The pre-defined pattern may include transitions under various contexts, such as various lengths of marks and spaces. Further, the controller 170 can control the OPU 160 to read the recorded pattern from the optical disc 190. The controller 170 may receive electrical signals with edges corresponding to the transitions between spaces and marks. The controller 170 may measure edge timings and edge timing distributions for the various contexts with regard to a system clock.

Additionally, the controller 170 may include edge timing targets, such as in the form of a target matrix, and edge timing sensitivities, such as in the form of a sensitivity matrix. The edge timing targets may correspond to edge timings that are known of high recording performance. The edge timing sensitivities may correspond to edge timing changes with regard to changes in the write strategy, such as timing changes in recording laser pulses. The edge timing targets and the edge timing sensitivities may be pre-determined, and can be stored in firmware that can be available to the controller 170. Then, based on the edge timing distributions, the edge timing targets and the edge timing sensitivities, the controller 170 may determine the changes of the recording laser pulses that can substantially achieve the edge timing targets.

In an embodiment, the edge timing sensitivities may be in the form of edge timing changes with regard to transition shifts. The controller 170 may first determine the transition shifts to achieve the edge timing targets, and then determine laser pulse parameters to achieve the transition shifts.

It is noted that the optical drive 150 may include various other components that can assist the recording operation and the reading operation. For example, the OPU 160 may include a set of lens for guiding the laser beam, and photodiodes for detecting the reflected light from the recording track.

It is also noted that the optical drive 150 may operate with the other components of the medium system 100 for various applications. For example, the processor 110 can execute instructions, and perform data operations. The processor 110 may provide data to the optical drive 150 for storing on the optical disc 190.

The non-volatile memory module 120 can hold information even when power is off. Therefore, the non-volatile memory 120 can be used to store system and application codes, such as firmware. The RAM module 115 is readable and writable. Generally, the RAM module 115 can have a fast access speed. It can be preferred that data and codes are stored in the RAM module 115 during operation, such that the processor 110 can access the RAM module 115 for the codes and the data instead of the non-volatile memory 120.

The user input module 130 may enable the user to control operations of the medium system 100. The user input module 130 may include various user input devices, such as keyboard, mouse, touch screen, and the like. In addition, the user input module 130 may include interfaces that can enable external user input devices.

The audio/video module 125 may include various audio and video devices, such as microphone, display screen, and the like. In addition, the audio/video module 125 may include interfaces that can enable external audio and video devices. The audio/video module 125 can be utilized to play audio data/video data that can be stored in the optical disc 190.

The network module 135 and the wireless communication module 140 may enable the medium system 100 to receive data from other system. The received data can be recorded on the optical disc 190.

Figure 2:
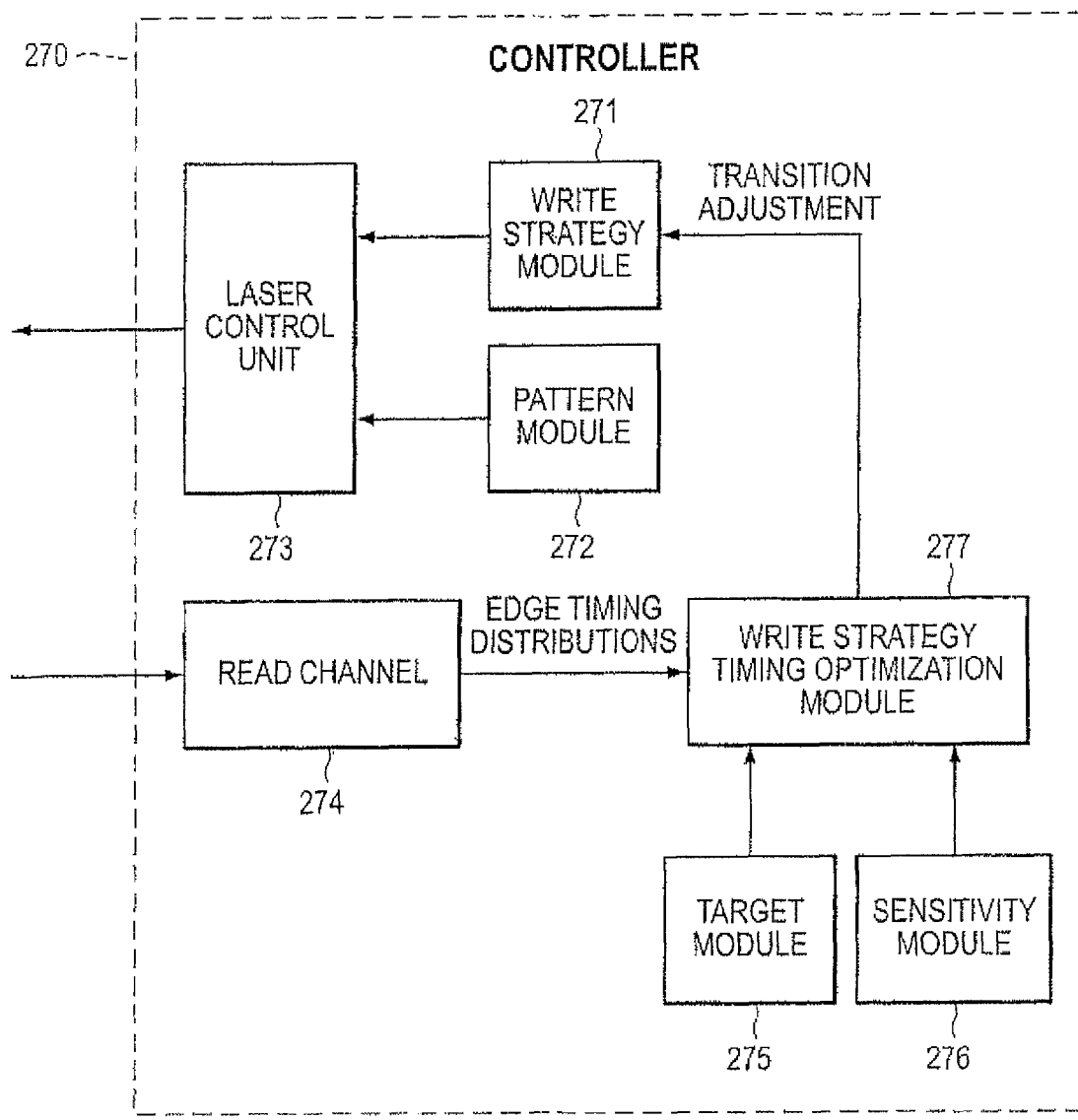
FIG. 2 shows a block diagram of an exemplary controller for an optical drive.

FIG. 2 shows an exemplary controller module 270 according to an embodiment of disclosure. The controller 270 may include a write strategy module 271, a pattern module 272, a laser control unit 273, a read channel module 274, a target module 275, a sensitivity module 276, and a write strategy timing optimization module 277. These elements can be coupled together as shown in FIG. 2.

The write strategy module 271 may include various types of write strategies for laser pulses, such as block strategy, castle strategy, and the like. Each type of write strategy may include adjustable write strategy parameters. The write strategy module 271 may provide a write strategy, such as a type of write strategy with write strategy parameter values, to the laser control unit 273 to record data. For example, the write strategy module 271 may provide an initial write strategy, such as a type of write strategy with default parameter values, to the laser control unit 273 at a beginning of a write strategy timing optimization process. In an embodiment, the initial write strategy may be determined based on ADIP information of a specific optical disc. Additionally, the write strategy module 271 may provide an optimum write strategy based on information from the write strategy timing optimization module 277.

The write strategy module 271 may include write strategy parameter registers for holding write strategy parameters. The write strategy module 271 may adjust the write strategy parameters based on the information from the write strategy timing optimization module 277. In an embodiment, the write strategy module 270 may include a table for a write strategy. The table may include entries for various recording contexts, such as transitions between various lengths of marks and spaces. Each entry may define laser pulse parameters for recording one or more transition contexts.

The pattern module 272 may provide recording patterns to the laser control unit 273. For example, the pattern module 272 may provide a pre-defined pattern to the laser control unit 273 for the write strategy timing optimization process. In an embodiment, the pre-defined pattern may include a number of occurrences for each transition context. Additionally, the pattern module 272 may convert data into a recording pattern, and provide the recording pattern to the laser control unit 273 for recording.

The laser control unit 273 can control a laser source based on the write strategy and the recording pattern. Thus, the recording pattern can be recorded on the specific optical disc according to the write strategy.

The read channel module 274 can receive signals corresponding to patterns on the optical disc from an OPU. For example, the read channel module 274 can receive a voltage signal corresponding to the recorded pre-defined pattern on the optical disc in the write strategy timing optimization process. Further, the read channel module 274 can detect edges, such as voltage increase edges and voltage decrease edges in the voltage signal. The edges can correspond to transitions in the recorded pattern on the optical disc. Then, the read channel module 274 can measure edge timings with regard to a clock signal, such as a system clock signal. Additionally, the read channel module 274 may analyze the edge timing distributions, and provide the edge timing distributions to the write strategy timing optimization module 277. In an embodiment, the read channel module 274 may calculate means and variances for the edge timing distributions, and provide the means and variances to the write strategy timing optimization module 277. In another embodiment, the read channel module 274 may provide the edge timings to the write strategy timing optimization module 277, and the write strategy timing optimization module 277 may include a calculation unit to calculate the means and variances.

The write strategy timing optimization module 277 can receive edge timing distributions from the read channel module 274. In addition, the write strategy timing optimization module 277 can receive edge timing targets, such as edge timing means targets and edge timing variances targets, from the target module 275, and edge timing sensitivities from the sensitivity module 276. The edge timing targets may correspond to desired edge timings. The edge timing sensitivities may represent changes of edge timings with regard to changes in the transitions. In an embodiment, the edge timing targets can be in the form of a target matrix, and the edge timing sensitivities can be in the form of one or more sensitivity matrices. Further, the write strategy timing optimization module 277 can determine transition adjustments based on the edge timing distributions, the edge timing targets and the edge timing sensitivities. In an embodiment, the write strategy timing optimization module 277 may use matrix calculation to calculate the transition adjustments. The transition adjustments can be provided to the write strategy module 271 to adjust the write strategy accordingly.

According to an embodiment of the disclosure, the write strategy module 271 may adjust the write strategy registers that define the laser pulse parameters for recording the transitions, such that the adjustments of the laser pulses can result in the desired adjustments in the recorded transitions between marks and spaces.

It is noted that the elements of the controller 270 may be implemented as software, hardware, and combinations of software and hardware.

Figure 3:
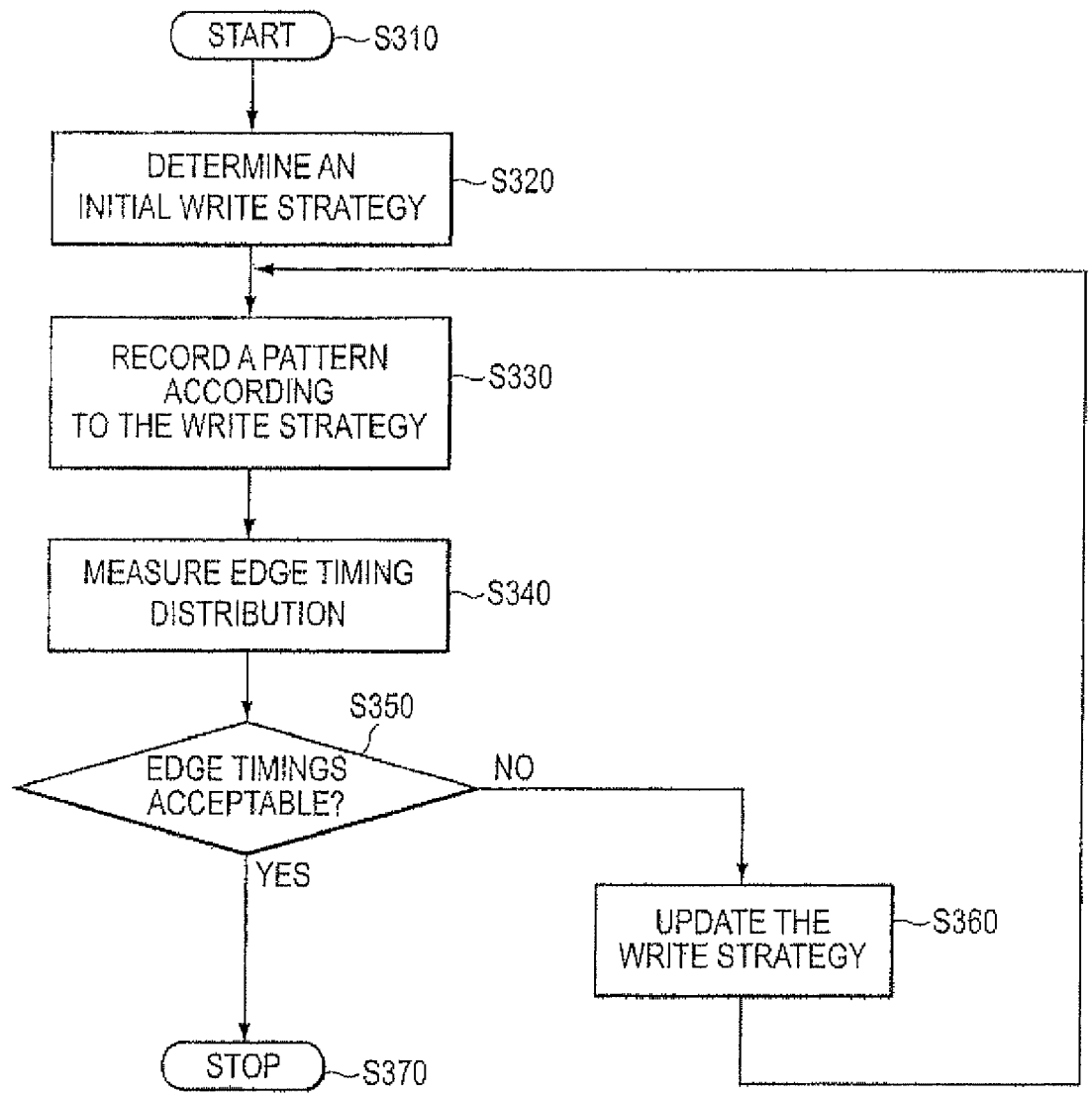
FIG. 3 shows a flowchart outlining an exemplary calibration process.

FIG. 3 shows a flowchart outlining an exemplary write strategy timing optimization process. The process starts at step S310 and proceeds to step S320.

In step S320, an optical drive can determine an initial write strategy for recording on a specific optical disc. In an embodiment, the optical drive may determine the initial write strategy based on ADIP information on the specific optical disc. Then, the process proceeds to step S330.

In step S330, the optical drive can record a pre-defined pattern according to an initial write strategy on the specific optical disc. The pre-defined pattern may include a number of occurrences for each possible transition context. Then, the process proceeds to step S340.

In step S340, the optical drive may measure edge timings with regard to, for example a system clock, and may analyze the edge timing distributions, such as means, variances, and the like. The optical drive can read the recorded pattern from the optical disc. The optical drive may receive an electrical signal corresponding to the recorded pattern. The electrical signal may include voltage increase and decrease edges corresponding to the transitions between spaces and marks in the recorded pattern. The optical drive may measure the timings of the increase and decrease edges. Then, the process proceeds to step S350.

In step S350, the optical drive may determine if the measured edge timings are acceptable. The optical drive may include edge timing targets, such as edge timing means targets, and edge timing variances targets, for example, in a memory unit, and may compare means and variances of the measured edge timings with the edge timing targets. When the measured edge timings are acceptable, for example within a range of the edge timing targets, the process proceeds to step S370, and terminates. Otherwise, the process proceeds to step S360.

In step S360, the optical drive may determine transition adjustments to update the write strategy. The transition adjustments can be determined based on the edge timing distributions, edge timing targets and edge timing sensitivities. In an embodiment, the transition adjustments can be determined additionally based on one or more attenuation factors. Then, the process returns to step S330, where the optical drive may use the updated write strategy to record a pre-defined pattern, which can be the same pre-defined pattern as the previous recording or can be a different pre-defined pattern from the previous recording.

Figure 4C:
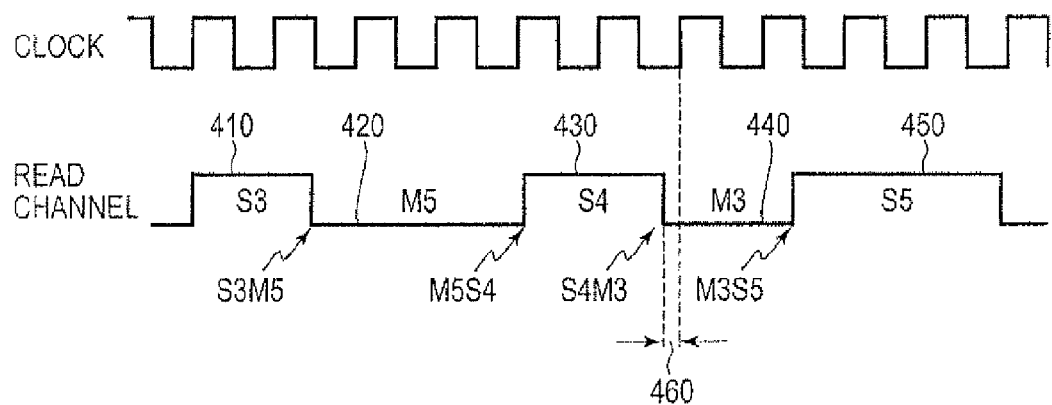

FIGS. 4A-4D show exemplary tables and plots for obtaining edge timing distribution according to an embodiment of the disclosure. FIG. 4A shows a summary table for transitions from spaces to marks according to an exemplary pre-defined pattern. The summary table may include field 401 in column direction for lengths of preceding space, and field 402 in row direction for lengths of mark. Generally, the lengths of the spaces and marks may be represented in terms of clock cycles. Each element in the table can indicate a number of occurrences of a specific transition context in the pre-defined pattern. The transition context may have a preceding space of a length indicated by field 401, and a mark of a length indicated by field 402. For example, element 403 can indicate 60 occurrences of a transition from a space having a length corresponding to 4 clock cycles (S4) to a mark having a length corresponding to 3 clock cycles (M3).

FIG. 4B shows a summary table of transitions from marks to spaces according to an exemplary pre-defined pattern. The summary table may include field 405 in column direction for lengths of following space, and field 406 in row direction for length of mark. Each element in the table can indicate a number of occurrences of a specific transition context in the pre-defined pattern. The specific transition context may have a mark of a length indicated by field 406, and a following space of a length indicated by field 405. For example, element 407 can indicate 60 occurrences of a transition from a mark having a length corresponding to 3 clock cycles (M3) to a space having a length corresponding to 5 clock cycles (S5).

FIG. 4C shows a portion of an exemplary read channel signal with regard to a clock signal according to an embodiment of the disclosure. The read channel signal may have high voltage portions corresponding to spaces on a recording track, and low voltage portions corresponding to marks on the recording track. For example, high voltage portions 410, 430, and 450 may correspond to spaces S3, S4 and S5 respectively, and low voltage portions 420 and 440 may correspond to marks M5 and M3 respectively. The read channel signal may have leading and trailing edges corresponding to transitions between spaces and marks. In the example, a leading edge may correspond to a transition from mark to space, which may be represented by MXSY, such as M5S4 and M3S5, and a trailing edge may correspond to a transition from space to mark, which may be represented as SXMY, such as S3M5 and S4M3.

Figure 4D:
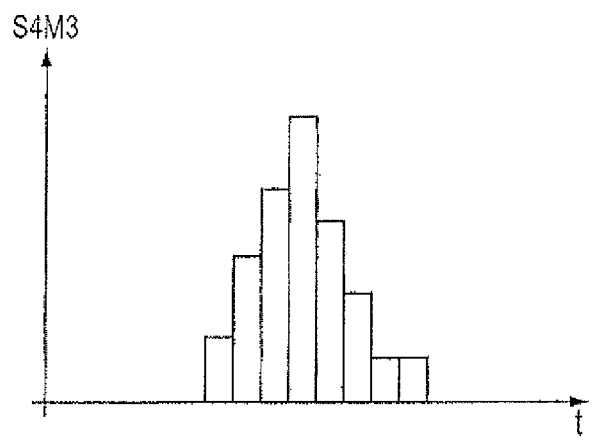

The edge timings may be measured with regard to the clock signal. For example, the edge timing corresponding to transition S4M3 may be measured by timing difference indicated as 460 in FIG. 4. Further, the edge timings corresponding to transitions may be statistically analyzed. FIG. 4D shows an exemplary edge timing distribution plot for the transition S4M3. Additionally, statistical parameters, such as means and variances, may be calculated for the transitions. The means and the variances can be indications of recording quality on an optical disc. Therefore, the variances and the means can be used to determine powers and timings of laser pulses for recording on the optical disc. For example, an algorithm to determine powers and timings of laser pulses to record on a phase change medium, which can be re-writable, may take consideration of either means or variances, and can also take consideration of both.

FIGS. 5A and 5B show exemplary edge timing sensitivity matrices 510 and 520 according to another embodiment of the disclosure. The edge timing sensitivity matrices 510 and 520 can take into consideration lengths of a context mark and a context space. The edge timing sensitivity matrix 510 may correspond to transitions from spaces to marks, and the sensitivities can be indicated by $S_{SXMY}$. Similarly, the edge timing sensitivity matrix 520 may correspond to transitions from marks to spaces, and the sensitivities can be indicated by $S_{MXSY}$.

More specifically, the edge timing sensitivity matrix 510 may include a first dimension for lengths of a preceding space, such as S3-S9, and a second dimension for lengths of a following mark, such as M3-M6, of a transition. Each element in the edge timing sensitivity matrix 510 may correspond to a transition from a context space having a length according to the first dimension, to a context mark having a length according to the second dimension. The value of the element can indicate timing change of an edge corresponding to the transition with regard to laser pulse changes that result in a unit change of the transition.

Similarly, the edge timing sensitivity matrix 520 may include a first dimension for lengths of a preceding mark, such as M3-M6, and a second dimension for lengths of a following space, such as S3-S9, of a transition. Each element in the edge timing sensitivity matrix 520 may correspond to a transition from a context mark having a length according to the first dimension, to a context space having a length according to the second dimension. The value of the element can indicate timing changes of an edge corresponding to a unit change of the corresponding transition.

It is noted that certain transitions may not be used in a given pattern scheme. For example, S8M5, S9M4, S9M5, M5S8, M5S9, and M4M9 do not exist in the example of FIGS. 5A and 5B.

In an embodiment, the edge timing sensitivity matrices 510 and 520 may be pre-calibrated, and stored, for example in firmware. It is noted that the edge timing sensitivity matrices 510 and 520 may be updated when more accurate versions are available.

FIG. 5C shows exemplary equations for determining transition adjustments based on the sensitivity matrices in FIG. 5A and FIG. 5B. According to the disclosure, an optical drive may record a pre-defined pattern on an optical medium according to a write strategy. The pre-defined pattern may include a number of occurrences for each transition, which can be indicated by MXSY and SXMY. The optical drive may read the recorded pattern, and measure edge timing distribution for each transition, which can be indicated by $P_{MXSY}$ and $P_{SXMY}$ FIG. 5C. Additionally, the optical drive may include an edge timing target for each transition, which can be indicated by $T_{MXSY}$ and $T_{SXMY}$ in FIG. 5C.

The optical drive may calculate a difference between the measured edge timing distribution, and the edge timing target for each transition. Further, the optical drive can calculate a transition adjustment, which can be indicated by $A_{MXSY}$ and $A_{SXMY}$ in FIG. 5C, of each transition based on the difference and the edge timing sensitivity corresponding to the transition. In the example of FIG. 5C, the optical drive may divide the difference by the edge timing sensitivity, which can be indicated by $S_{MXSY}$ and $S_{SXMY}$ in FIG. 5C. Additionally, the optical drive may scale the calculated transition adjustment by an attenuation factor F, such as 0.8. Then, the transition adjustments can be used to update the write strategy, for example, change laser pulse timings stored in the write strategy registers. Further, the optical drive may record a pre-defined pattern, either the same as the previous pre-defined pattern, or a different pre-defined pattern, on the optical medium to determine if the updated write strategy can satisfy the edge timing targets, for example, within a tolerable range of the edge timing targets.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A controller configured to provide a first write strategy for a recording unit to record a pre-defined pattern on an optical medium, measure edge timings corresponding to the recorded pre-defined pattern, provide a second write strategy for the recording unit to record user data, the second write strategy including at least timing modifications to the first write strategy, the timing modifications being proportional to differences between measured edge timings and edge timing targets, and being inversely proportional to edge timing sensitivities, wherein the recording unit is configured to record patterns on the optical medium according to a write strategy.

2. The controller according to claim 1, further comprising:
a reading unit coupled to the controller and configured to generate reading signals corresponding to recorded patterns on the optical medium.

3. The controller according to claim 1, wherein the controller is further configured to provide the timing modifications based on variances of the edge timings, edge timing variances targets, and edge timing sensitivities to the timing modifications.

4. The controller according to claim 3, further comprising:
a memory unit configured to store the edge timing variances targets and the edge timing sensitivities.

5. The controller according to claim 1, wherein the edge timing sensitivities are defined by degrees of a timing change of an edge caused by a transition from a space of the pre-defined pattern to a mark of the pre-defined pattern or from the mark to the space.

6. The controller according to claim 1, wherein the pre-defined pattern includes an optical power and timing calibration pattern.

7. The controller according to claim 1, wherein the pre-defined pattern is recorded in an optical power calibration section of the optical medium.

8. The controller according to claim 1, wherein each of the edge timing sensitivities is a function of context spaces and context marks.

9. The controller according to claim 1, wherein each of the timing modifications is scaled by an attenuation factor.

10. The controller according to claim 1, wherein the second write strategy includes power modifications to the first write strategy.

11. A method to optimize optical recording, comprising:
causing recording patterns on an optical medium by a recording unit according to a write strategy;
providing a first write strategy by a controller for the recording unit to record a pre-defined pattern on the optical medium;
measuring edge timings corresponding to the recorded pre-defined pattern; and
providing a second write strategy for the recording unit to record user data, the second write strategy including at least timing modifications to the first write strategy, the timing modifications being proportional to differences between measured edge timings and edge timing targets, and being inversely proportional to edge timing sensitivities.

12. The method according to claim 11, further comprising:
causing generation of reading signals by a reading unit, the signals corresponding to recorded patterns on the optical medium.

13. The method according to claim 11, further comprising:
providing the timing modifications based on variances of the edge timings, edge timing variances targets, and edge timing sensitivities to the timing modifications.

14. The method according to claim 13, further comprising:
storing the edge timing variances targets and the edge timing sensitivities in a memory unit.

15. The method according to claim 11, further comprising:
defining the edge timing sensitivities by degrees of a timing change of an edge caused by a transition from a space of the pre-defined pattern to a mark of the pre-defined pattern or from the mark to the space.

16. The method according to claim 11, wherein the pre-defined pattern includes an optical power and timing calibration pattern.

17. The method according to claim 11, further comprising:
causing recording of the pre-defined pattern in an optical power calibration section of the optical medium.

18. The method according to claim 11, wherein each of the edge timing sensitivities is a function of context spaces and context marks.

19. The method according to claim 11, wherein each of the timing modifications is scaled by an attenuation factor.

20. The method according to claim 11, wherein the second write strategy includes power modifications to the first write strategy.

* * * * *